Dec. 22, 1970 F. E. LUBORSKY 3,549,418

MAGNETIC RECORDING FILMS OF COBALT

Filed Oct. 9, 1967

Inventor :
Fred E. Luborsky,
by John J. Kessane
His Attorney.

3,549,418

MAGNETIC RECORDING FILMS OF COBALT

Fred E. Luborsky, Schenectady, N.Y., assignor to General Electric Company, a corporation of New York Filed Oct. 9, 1967, Ser. No. 673,790
Int. Cl. H01f 10/02
U.S. Cl. 117—240 2 Claims

ABSTRACT OF THE DISCLOSURE

A magnetic recording medium characterized by a non-magnetic substrate and an overlying magnetic film consisting essentially of cobalt and molybdenum wherein molybdenum forms between 40 and 80% by weight of the film. The cobalt-molybdenum film is further characterized by a thickness less than 10 microns and possesses both a coercive force greater than 100 oersteds and a remanence greater than 500 gauss.

Figure 1:
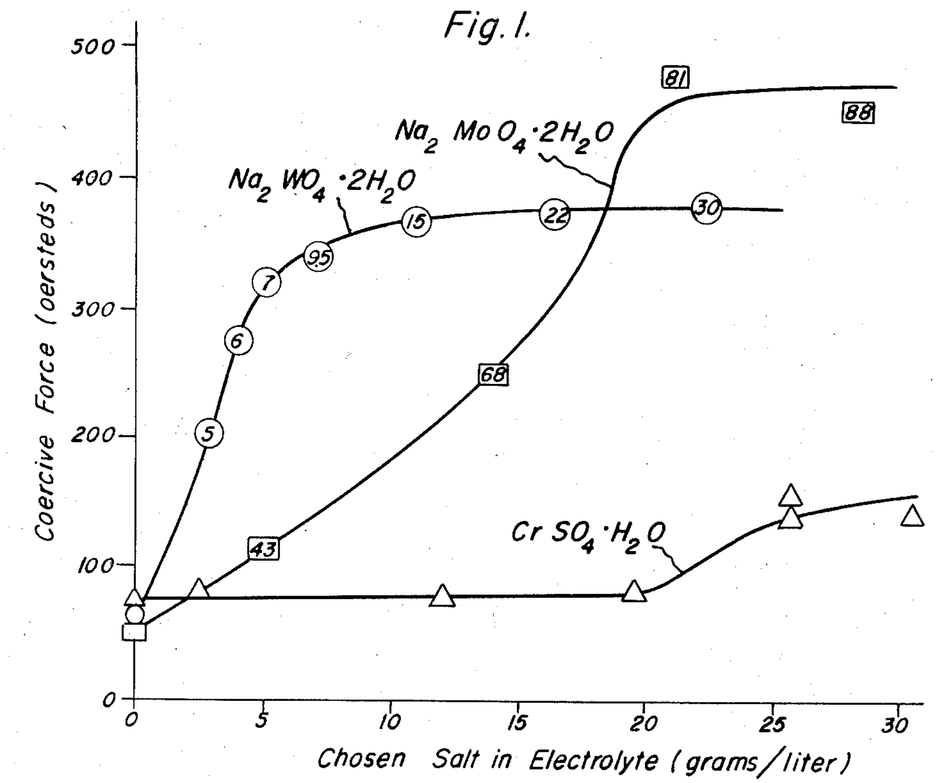

This invention relates to magnetic recording media and in particular to magnetic recording media having a magnetic film formed essentially of cobalt and an element chosen from the group consisting of the Group VI–B metals and zinc. Thin film ternary allows of cobalt, nickel and an element chosen from the group consisting of the Group VI–B metals and zinc also have been found to exhibit a remanence and coercive force of sufficient magnitude for utilization in magnetic recording media.

Among the more important characteristics for a magnetic film in a recording medium, particularly in the computer field, are the susceptibility of the magnetic film to high density retention of information and the ability of the magnetic film to generate a substantial output voltage during subsequent readout. These characteristics are primarily dependent upon the coercive force, the remanence and the thickness of the magnetic film with 100 oersteds and 500 gauss being the generally acceptable minimum values of coercive force and remanence, respectively, for commercial disc or tape recordation. In addition, magnetic films should be quite thin, e.g. preferably less than 10 microns, in order that the film retain information at high densities. Because there is a necessary interrelationship between these desired film characteristics, e.g. no one of the desired characteristics generally can be varied independently, the tolerable limits for coercive force, remanence and thickness generally must be simultaneously exceeded in a film material before the material can be considered suitable for high quality recording purposes. Other characteristics of importance for the commercial utilization of thin magnetic films for magnetic recording media are the wear resistance, coefficient of friction, hardness, corrosion resistance and environmental stability of the films. All of these characteristics generally are affected by the microstructure and percent of the metals forming the film.

Heretofore magnetic thin films of cobalt phosphorus and cobalt nickel phosphorus alloys, formed by such methods as electroless deposition or electrodeposition, have been known to possess both a high coercive force and a high remanence and generally have been exclusively utilized in commercially available magnetic recording films.

I have found however that films suitable for magnetic memory devices, e.g. films less than 10 microns thick having both a coercivity greater than 100 oersteds and a remanence greater than 500 gauss, can be fabricated from alloys of cobalt with an element chosen from the group consisting of the Group VI–B metals and zinc. Furthermore, ternary alloys with nickel of the magnetic alloys of this invention have also exhibited magnetic properties suitable for magnetic recording. The alloys of this invention also have demonstrated superior wear resistance and hardness relative to magnetic alloys of the prior art.

It is therefore an object of this invention to provide magnetic thin film recording media employing a new family of magnetic alloys.

It is also an object of this invention to provide magnetic thin film recording media having superior hardness, wear resistance, frictional characteristics and environmental stability.

These and other objects of this invention are accomplished by a magnetic recording medium comprising a substrate and a magnetic layer consisting essentially of cobalt and an element chosen from the group consisting of the Group VI–B metals and zinc positioned atop the metallic substrate. Magnetic properties suitable for high quality recording also are obtainable when the cobalt alloy forming the magnetic layer has a quantity of nickel alloyed therein.

Figure 2:
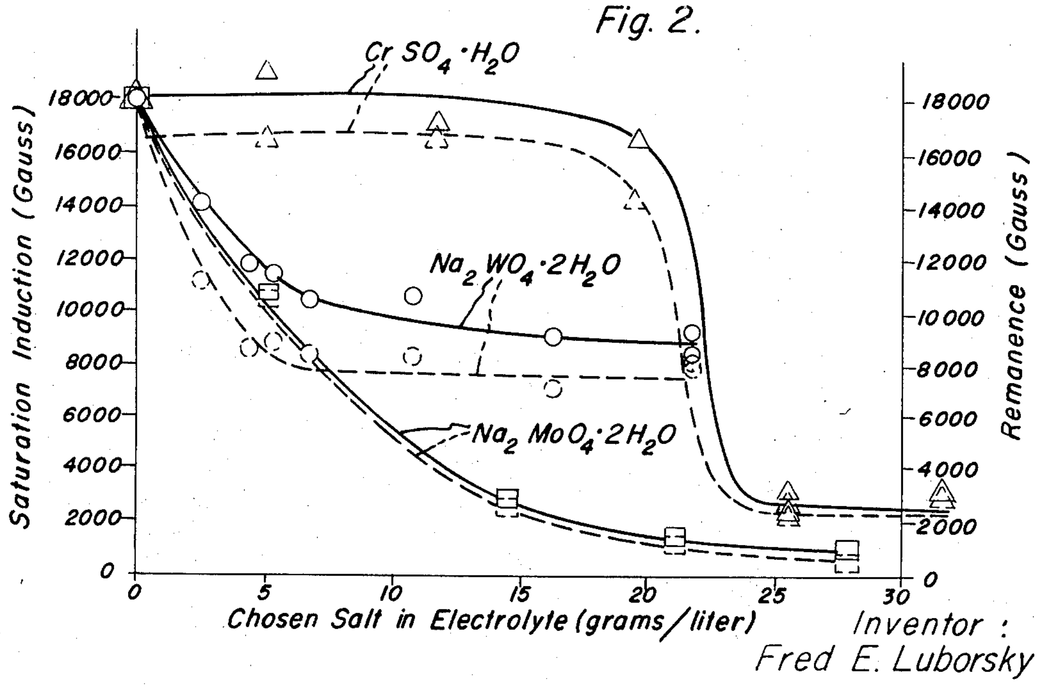

The features of this invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 1 is a graph depicting the variation in coercive force with the concentration of the chosen metal salt in typical electrolytic solutions. The percent by weight chosen metal in various magnetic film samples formed from the solutions are depicted within the geometric configurations identifying specific samples along the curves of FIG. 1, and FIG. 2 is a graph depicting the variation of saturation induction (depicted in solid lines) and remanence (depicted in dotted lines) with the concentration of the chosen metal salt in the typical electrolytic solution.

In the formation of the magnetic media of this invention, a suitable non-magnetic highly polished substrate, such as copper, is cut to the desired configuration for the finished product, e.g. into disc-shape, and the substrate is cleaned in a conventional manner before plating, e.g. through the use of the well known alkaline-acid-water methods utilized by present day plating industries to remove any surface dirt which dirt would adversely affect the magnetic properties of the subsequently to be deposited thin magnetic film. The material chosen for the substrate can vary, being dependent upon such factors as weight limitations, cost and the tolerable surface smoothness or flatness required, with such materials as copper, copper alloys, copper overlaid with gold, or aluminum successively overlaid with zinc and nickel phosphorus being suitable as substrates for disc recording. A more flexible substrate material, such as Mylar successively overlaid with tin and nickel phosphorus layers, preferably is utilized in the formation of magnetic recording tapes. The outermost surface of the substrate, however, usually is a relatively hard material, e.g. brass, bronze or nickel phosphorus, to accept the high polish required for uniformity of magnetic film deposition. The degree of smoothness required for a particular substrate surface generally is dependent upon the desired recording density for the magnetic film to be deposited thereon, e.g. the substrate surface preferably is uniform over an area smaller than the bit span at maximum density recordation to assure uniform recording characteristics in the film.

After the final polished substrate has been cleaned and rinsed in distilled water, the substrate is connected to a negative terminal of a suitable electrical power supply, e.g. a variable source providing D.C. output voltages in a range between 0–50 volts, and at least a portion of the substrate is submerged within an electrolyte formed by the dissolution in water of a cobalt salt, e.g. $CoSO_4 \cdot 7H_2O$, and a salt of a metal chosen from the group consisting of the Group VI–B metals and zinc. The positive terminal of the power supply then is applied to the electrolytic solution by suitable means, for example, by an anode electrically connected to the positive terminal of the power supply and partially submerged in the electrolyte, to allow current flow through the electrolyte thereby plating the cathode substrate with a thin alloy film of cobalt and the chosen metal. The anode can be either active or passive with materials such as platinum or cobalt being examples of suitable cathode materials. A current flow of 2.08 ma./cm.$^2$ through the electrolytic solution for a period of 10 minutes has been found to deposit an approximately 0.4 micron thick magnetic alloy film upon the substrate. Although the magnetic films of this invention are often referred to as being alloys of cobalt, the term "alloy" as utilized herein is intended to include intermetallic compounds, two phase metallic mixtures and true alloys of the metals as defined in the metallurgical texts.

The ratio of the cobalt salt to the salt of the metal chosen from the group consisting of the Group VI–B metals and zinc dissolved in the electrolyte generally is determined by the magnetic characteristics desired for the magnetic film with the coercive force of the alloys, as depicted in FIG. 1 for a typical electrolyte, generally increasing to a plateau level with increasing quantities of the chosen metallic salt. Because the remanence, portrayed by dotted lines in FIG. 2, of the chemically deposited films was found to decrease with increased percentages of the chosen metallic salt ,the optimum proportion of the chosen metallic salt in the electrolytic solution is dependent upon the coercive force and/or remanence desired for a particular alloy film.

An acid such as sulfuric acid or a base, such as sodium hydroxide, can be added to the electrolytic solution to control the pH level of the electrolyte. The pH level preferred for the deposition of cobalt alloys of the Group VI–B metals and zinc will vary dependent upon the particular electrolyte system chosen as will be seen in the various specific examples to be presented.

Lower current densities (and the slower deposition rates of the alloy films associated therewith) generally result in greater coercive forces for alloy films slowly plated from the electrolyte. For example, magnetic films deposited from a fixed cobalt-tungsten electrolyte at a temperature of 25° C. exhibited a coercive force greater than 100 oersteds only for a current density less than approximately 8.0 ma./cm.$^2$. This has been shown by analysis to be due to the fact that the ratio of tungsten to cobalt deposited upon the submerged substrate from the electrolytic solution increased with decreasing current densities. As can be seen from the weight percentages of tungsten, which percentages are indicated numerically within the geometrical configuration identifying various specific specimens along the graph of FIG. 1, films having a tungsten content between approximately 1%–40% by weight of the cobalt-tungsten film possess a sufficiently high coercive force and remanence to make cobalt-tungsten films with a 1%–40% tungsten content preferable for magnetic recording purposes.

The flow of current through the electrolyte is continued until the substrate is coated to a desired thickness, e.g. less than approximately 10 microns, with an alloy film of cobalt and the metal chosen from the group consisting of the Group VI–B metals and zinc. Film thickness between approximately 0.1 micron and 2.0 micron were found to be preferable for most magnetic memory recording purposes.

The electrolytic solution generally is maintained at a temperature of approximately 25° C. during plating for convenience. Higher and lower electrolyte temperatures however afford various known advantages, e.g. development of finer grain sizes at low temperatures or lower power dissipation in the electrolyte and higher deposition efficiency at higher temperatures, and can be utilized for the deposition when desired.

Ternary alloys of cobalt, nickel and a metal chosen from the group consisting of the Group VI–B metals and zinc are formed by the addition of a soluble nickel salt, e.g. $NiSO_4 \cdot 6H_2O$, to the electrolytic solution utilized in forming the binary cobalt alloy. The initial additions of the nickel salt to the electrolytic solution generally produce an increase in the coercive force and a decrease in the remanence exhibited by the magnetic films plated from the solution. A peak coercive force in films plated from the solution, however, is reached with continued addition of the nickel salt to the solution whereupon the coercive force of the plated film begins to decrease with continued saturation of the electrolytic solution with the nickel salt. Continued additions of the nickel salt to the solution also effect a further lowering of the remanence in films plated from the solution. For example, cobalt with small amounts of tungsten may have a value of remanence approaching 18,000 gauss at most, whereas nickel tungsten films (plated from electrolytes having a high nickel content) may have a remanence of no more than about 6000 gauss. The intermediate alloys of cobalt and nickel with tungsten have remanence values which decrease monatomicly between these two extremes.

A more complete understanding of the basic principles of this invention can be obtained from the following examples of typical magnetic films formed by electrodeposition. While the specific examples and the disclosure of this invention relate to the formation of the magnetic alloys of this invention by electrodeposition from specific electrolytes, various other soluble salts of the metals forming the magnetic alloy of this invention can be employed utilizing a variety of addition agents and complexing agents well known to the cobalt deposition art.

EXAMPLE 1

A copper substrate of suitable size, after being cleaned in acetone and detergent to remove surface dirt and rinsed in distilled water, was partially submerged in an electrolytic solution of:

250 g./l. $CoSO_4 \cdot 7H_2O$
21 g./l. $CoCl_2 \cdot 6H_2O$
11.1 g./l. $Na_2WO_4 \cdot 2H_2O$ and
30 g./l. $H_3BO_4$ having a temperature of 25° C. and a pH of 5.1. The negative terminal of an adjustable power supply then was connected to the substrate and the positive terminal of the power supply was applied to the electrolytic solution through a cobalt anode to produce a current flow of 2.08 ma./cm.$^2$ through the electrolytic solution thereby plating a cobalt-tungsten film upon the substrate. Plating was continued for a period of ten minutes whereupon the copper substrate was removed from the electrolytic solution, rinsed in distilled water and air dried. The thickness of the cobalt-tungsten film deposited upon the substrate was calculated from its measured weight to be approximately 0.4 microns and the film exhibited a coercive force of approximately 360 oersteds, a saturation inductance of 10,500 gauss and a remanence of approximately 8,500 gauss. Measurements of the magnetic properties of the film were made by a hysteresis loop tracer utilizing a 60 cycle/sec. magnetic drive field of known magnitude which magnitude was calibrated by measuring the voltage induced in a sense coil of known area and number of turns. The magnitude of the induced signal in the sense coils for measuring the magnetization of the samples was determined by a measurement of samples of pure nickel for which the saturation magnetization is 6080 gauss.

The alloy film then was successively exposed for periods of nine, nine and twenty-five days to humid atmospheres in air at 59° C., 95° C. and 155° C., respectively, with no change in coercive force being observed. Although the saturation magnetization of the film was observed to decrease slightly, e.g. approximately 10% during the period of exposure to the above environments, the decrease was approximately the same, but possibly less than, the decrease in saturation magnetization exhibited by thin films of cobalt-phosphorus. Furthermore, the surface roughness of the cobalt-tungsten films were found to decrease slightly with increasing deposition periods (from 3.0 to 2.5 micro-inches, center line average) while cobalt-phosphorus films exhibited an increasingly rough surface (from 4.0 to 5.0 micro-inches, center line average) when the thickness of the cobalt-phosphorus films were increased from zero to about 1.6 microns.

Measurements of the hardness of the cobalt-tungsten films were taken by decreasing the load on a point area of the film and extrapolating to zero load, e.g. representative of the hardness of the film alone. These measurements gave values of 80±10 D.P.H. (diamond point hardness) for a cobalt-tungsten film with a coercive force equal to 170 oersteds and a remanence equal to 12,000 gauss. For comparison a cobalt nickel phosphorus film with a coercive force of 985 oersteds and a remance of 5,000 gauss gave the lower value of 50±10 D.P.H.

Although the temperature of the electrolytic solution was maintained at 25° C. during the deposition, relatively little difference in the coercive force of the film was noted with variations in temperature of the electrolytic solution. For example, a variation of only 7.5% in coercive force was observed for an electrolytic temperature variation between 20° C. and 40° C. It was noted however that a variation in coercive force of about 44% was exhibited by cobalt-nickel phosphorus films deposited from solutions of 25° C. and 40° C., respectively.

As can be seen from FIGS. 1 and 2, for coercive forces above 100 oersteds in the cobalt-tungsten magnetic films deposited from the electrolytic solution of the example, a minimum of approximately gram/1.0 liter of $Na_2WO_4 \cdot 2H_2O$ was required in the electrolytic solution. A remanence above 7,000 gauss generally was obtained for tungsten salt concentrations up to 22 grams/liter in the electrolytic solution whereupon the approximately zero slope of the remanence curve indicates that increasing quantities of the tungsten salt in the electrolytic solution would produce a negligible effect on remanence. Coercive forces above 350 oersteds were obtainable by the electrodeposition of cobalt-tungsten films utilizing tungsten salts in concentrations greater than approximately 9 grams/liter.

EXAMPLE 2

A copper substrate of suitable size was cleaned as described in Example 1 and an electrolytic solution was prepared consisting of:

77 g./l. $CoSO_4 \cdot 7H_2O$
6.5 g./l. $CoCl_2 \cdot 6H_2O$
48.5 g./l. $NiSO_4 \cdot 6H_2O$
30 g./l. $H_3BO_4$ and
3.6 g./l.$Na_2WO_4 \cdot 2H_2O$ After connecting the cleaned copper substrate to the negative terminal of an electrical power supply, the substrate was submerged within the electrolytic solution and the positive terminal of the power supply was applied to the electrolytic solution through a cobalt anode. A current flow of 1.0 ma./cm.$^2$ was passed through the electrolytic solution for a period of 20 minutes and a cobalt-nickel-tungsten alloy film was deposited upon the copper substrate to a thickness of approximately 0.25 microns. The pH of the solution was measured as 4.65 and the temperature of the solution was maintained at 25° C. during the plating of the alloy upon the substrate. After deposition of the alloy film, the substrate was removed from the electrolytic solution, rinsed in distilled water and air dried. Utilizing a hysteresis loop tracer, the coercive force of the film was measured to be 495 oersteds and the film exhibited a saturation inductance of approximately 7,000 gauss and a remanence of 5500 gauss. From X-ray fluorescence, the composition of the film was deduced to be 19% tungsten, 6% nickel and the remainder cobalt. Superior recording characteristics generally were obtainable when tungsten formed from 1–40% of the deposited cobalt-nickel-tungsten films.

EXAMPLE 3

An electrolytic solution was prepared consisting of:

36 g./l. $CoSO_4 \cdot 7H_2O$
100 g./l. sodium citrate and
14 g./l. $Na_2MoO_4 \cdot 2H_2O$ in water. A cleaned copper substrate of suitable size then was connected to the negative terminal of a power supply and partially submerged within the electrolytic solution. Upon applying the positive terminal of the power supply to the electrolytic solution through a cobalt anode, a current of 2.08 ma./cm. was observed to flow through the electrolytic solution. The pH of the electrolytic solution measured 3.8 and the temperature of the solution was maintained at 25° C. After electrodeposition for a period of ten minutes, the substrate was removed from the solution and a magnetic film of cobalt-molybdenum measuring approximately 0.43 microns was observed. The coercive force of the film measured 245 oersteds while the saturation inductance and remanence were calculated to be approximately 2800 and 2750 gauss, respectively. From X-ray fluorescence measurements the composition was calculated to be 68% molybdenum and 32% cobalt. As depicted in FIGS. 1 and 2, $Na_2MoO_4 \cdot 2H_2O$ concentrations of at least 4.5 grams/liter were required to produce a coercive force above 100 oersteds in magnetic films plated from the particular electrolytic of the example while remanence readings above 500 gauss were obtainable with molybdenum salt concentrations up to at least approximately 20 grams/liter. The most desirable characteristics for recording purposes generally were possessed by cobalt-molybdenum films having molybdenum concentrations between 40 to 80% of the film weight (as can be seen from FIG. 1 wherein the weight percentages of molybdenum are numerically designated at selected points along the molybdenum-cobalt curve). The almost overlapping configuration of the remanence and saturation induction curves (shown in dotted and solid lines respectively in FIG. 2) indicates the extremely square hysteresis loop generally exhibited by the cobalt-molybdenum films.

EXAMPLE 4

An electrolytic solution was prepared by dissolving 48 g./l. $CoSO_4 \cdot 7H_2O$ and 25.7 g./l. $CrSO_4$ in a suitable quantity of water. A copper substrate, after being suitably cleaned as in Example 1, was partially submerged within the electrolytic solution and the negative terminal of a power supply was connected to the partially submerged copper substrate. The positive terminal of the power supply then was applied to the electrolytic solution by means of a cobalt anode and a current of 10.4 ma./cm.$^2$ was passed through the electrolytic solution for 2.0 minutes to plate a 0.4 micron thick thin film of cobalt-chromium upon the submerged portion of the copper substrate. The temperature of the electrolytic solution during the plating period was maintained at 25° C. and the pH of the solution measured 2.0. After the plating period had terminated, the substrate was removed from the electrolytic solution and rinsed in distilled water. The deposited film of cobalt-chromium exhibited a coercive force of 145 oersteds, a saturation inductance of about 2900 gauss and a remanence of approximately 2700 gauss upon subsequent measurement of the magnetic properties of the film utilizing a hysteresis loop tracer. Although coercive force films of approximately 150 oersteds were obtainable only by employing very high concentrations of chromium salt, e.g. above 30 grams/liter, in the electrolytic solution of the example, remanence measurements above 14,000 gauss were exhibited by cobalt-chromium films deposited with chromium salt concentrations less than 20 grams/liter. These high remanence films often are useful for specialized recording applications notwithstanding the relatively low coercive force values of the films.

EXAMPLE 5

An electrolytic solution was prepared by dissolving 29.9 g./l. $CoCO_4 \cdot 7H_2O$
21.4 g./l. $NiSO_4 \cdot 6H_2O$
3.0 g./l. $Na_2MoO_4 \cdot 2H_2O$ and
100 g./l. sodium citrate in a conveniently utilizable quantity of water. After a cleaned copper substrate was connected to the negative terminal of a power supply and the substrate was immersed within the electrolytic solution, a current of 2.08 ma./cm.$^2$ was passed through the electrolytic solution utilizing a cobalt anode for a period of ten minutes to form an approximately 0.43 micron thick cobalt-nickel molybdenum film upon the copper substrate. The temperature of the electrolytic solution was maintained at 25° C. during the plating period and the pH of the solution measured an acidic 3.4. Subsequent measurement of the magnetic properties of the electrodeposited film by a hysteresis loop tracer disclosed that the film possessed a saturation inductance of 1400 gauss, a remanence of 1200 gauss, and a coercive force of approximately 320 oersteds. Superior recording characteristics generally were obtainable in the cobalt-nickel-molybdenum film when molybdenum formed from 40–80% by weight of the deposited film.

EXAMPLE 6

After an electrolytic solution having a pH of 9.5 and a temperature of 25° C. was prepared by dissolving 44 g./l. $CoSO_4 7H_2O$
6.25 g./l. $ZnSO_4 7H_2O$
250 ml./l. $NH_4OH$ and
50 g./l. $NH_4SO_4$ in a suitable quantity of water, a cleaned copper substrate was connected to the negative terminal of a power supply and immersed within the electrolytic solution. The positive terminal of the power supply then was applied to the electrolytic solution through a cobalt anode and a current of 46.5 ma./cm.$^2$ was passed through the electrolytic solution for 3 minutes to form an approximately 2.9 micron thick cobalt-zinc film atop the copper substrate. Upon completion of the deposition, the substrate was disconnected from the power supply, removed from the electrolytic solution, rinsed in distilled water and air dried. Subsequent measurement of the magnetic properties of the deposited alloy film disclosed the film possessed a saturation inductance of approximately 3400 gauss, a remanence of approximately 3100 gauss and a coercive of 320 oersteds.

While several examples of this invention have been shown and described, it will be apparent to those skilled in the art that many changes and modifications may be made without departing from this invention in its broader aspects; and therefore the appended claims are intended to cover all such changes and modifications as fall within the true spirit and scope of this invention.

What I claim as new and desire to secure by Letters Patent of the United States is:

1. A magnetic recording medium comprising a non-magnetic substrate and a magnetic film coating thereon consisting essentially of cobalt and molybdenum where the molybdenum is in quantities between 40 and 80% by weight of the film disposed upon said substrate, said film being less than 10 microns thick and being characterized by a coercive force greater than 100 oersteds and a remanence greater than 500 gauss.

2. A magnetic recording medium comprising a non-magnetic substrate and a magnetic coating film disposed upon said substrate, said magnetic film consisting of cobalt, nickel and molybdenum where the molybdenum is in quantities between 40 and 80% by weight of the film, said film being less than 10 microns thick and being characterized by a coercive force greater than 100 oersteds and a remanence greater than 500 gauss.

References Cited

UNITED STATES PATENTS

| | | | |
|---|---|---|---|
| 2,158,132 | 5/1939 | Legg | 252—62.55X |
| 2,239,144 | 4/1941 | Dean et al. | 252—62.55 |
| 2,713,538 | 7/1955 | Harris et al. | 75—171 |
| 2,801,165 | 7/1957 | Baldwin et al. | 75—171X |
| 2,860,972 | 11/1958 | Fraser | 75—176 |
| 2,981,620 | 4/1961 | Brown et al. | 75—171X |
| 3,180,012 | 4/1965 | Smith | 75—176X |
| 3,271,140 | 9/1966 | Freche | 75—170 |
| 3,414,430 | 12/1968 | Maho | 75—170X |
| 3,415,643 | 12/1968 | Freche | 148—31.55X |
| 3,421,890 | 1/1969 | Baumel | 29—198X |

WILLIAM D. MARTIN, Primary Examiner

B. D. PIANALTO, Assistant Examiner

U.S. Cl. X.R.

29—195, 198, 199; 75—170, 171, 178; 117—235, 236, 239; 148—31.55; 252—62.55